(No Model.) 2 Sheets—Sheet 2.
C. W. CAMPBELL, J. J. HILL & W. E. DODD.
REEL FOR DISPLAYING AND MEASURING DRY GOODS.
No. 362,490. Patented May 10, 1887.
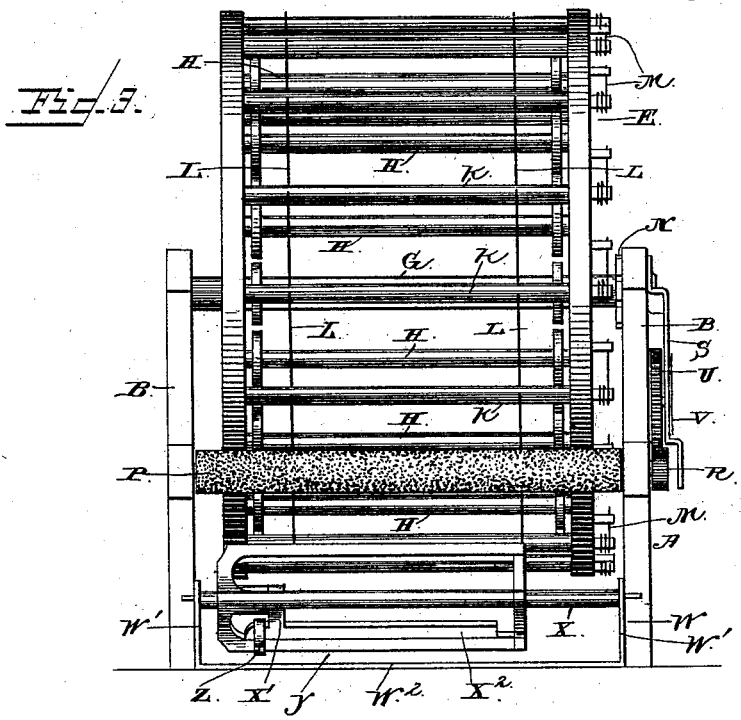
Witnesses  Inventors
 Chas. W. Campbell
 John J. Hill
 Wm. E. Dodd
By their Attorneys
N. PETERS, Photo-Lithographer, Washington, D. C.

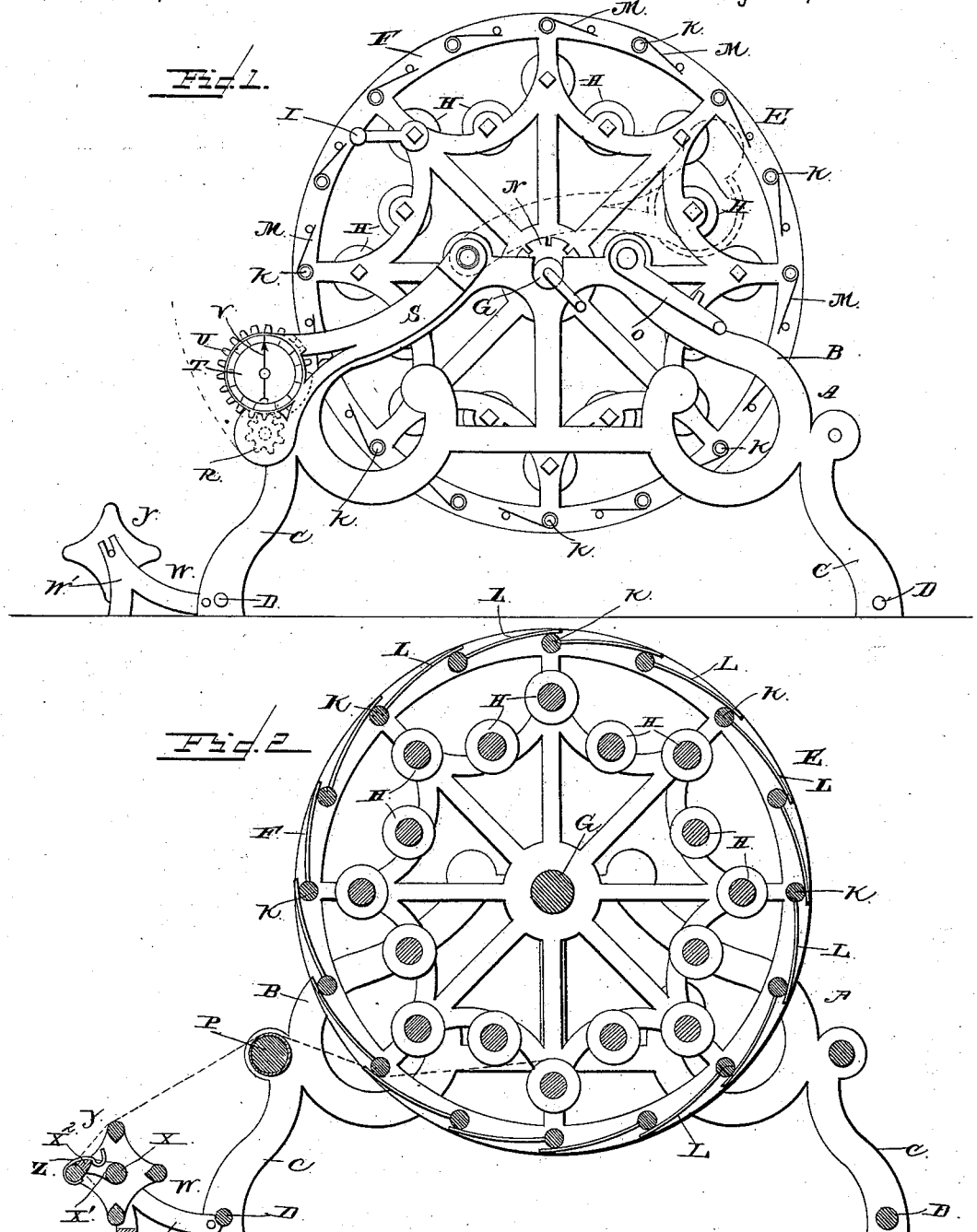

UNITED STATES PATENT OFFICE.

CHARLES WESLEY CAMPBELL, JOHN J. HILL, AND WILLIAM E. DODD, OF ROSE MILL, VIRGINIA.

REEL FOR DISPLAYING AND MEASURING DRY GOODS.

SPECIFICATION forming part of Letters Patent No. 362,490, dated May 10, 1887.

Application filed September 11, 1886. Serial No. 213,317. (No model.)

*To all whom it may concern:*

Be it known that we, CHARLES WESLEY CAMPBELL, JOHN J. HILL, and WILLIAM E. DODD, citizens of the United States, residing at Rose Mill, in the county of Nelson and State of Virginia, have invented a new and useful Improvement in Reels for Displaying and Measuring Dry Goods, of which the following is a specification.

Our invention relates to an improvement in reels for displaying and measuring dry goods; and it consists in the peculiar construction and combination of devices, that will be more fully set forth hereinafter, and particularly pointed out in the claims.

In the drawings, Figure 1 is a side elevation of a reel embodying our improvements. Fig. 2 is a vertical longitudinal sectional view of the same. Fig. 3 is an end elevation. Fig. 4 is a detailed perspective view of the hand-reel.

A represents the reel-frame, comprising the sides B, having the supporting-legs C, and connected together by means of transverse bars D.

E represents the reel, comprising the end disks, F, provided with a connecting central axle, G.

H represents a series of cloth-reels, which are journaled in the heads or disks of the reel E, and are arranged concentrically with the axle G thereof. The projecting ends of the axle G are journaled in bearings which are formed in the sides B of the reel-frame. The axles of the reels H project beyond one head of the reel E, and are squared, and thereby adapted to fit a crank-handle, I.

In the rims of the heads of the reel E are journaled a series of shafts, K, which correspond in number to the cloth-reels, and are each provided with curved teeth or tines L. The tines of one axle or shaft K are adapted to bear at their outer ends against the adjacent shaft. One end of each shaft K projects slightly beyond one head of the reel E, and on the said projecting ends of the shafts are secured springs M. The function of the said springs is to keep the teeth or tines of the shafts K normally closed on the adjacent shafts, as shown at Fig. 2.

On one end of the axle of the reel E is secured a disk, N, which is provided with a series of peripheral notches. A detent, O, is pivoted to one side of the frame of the reel, and is adapted to engage the said notches, and thereby prevent rotation of the reel E.

P represents a roller which is journaled transversely in one end of the reel-frame, and one end or spindle of the said roller is provided with a spur-pinion, R. The face of the roller is covered with sand-paper or is otherwise suitably roughened, so as to give it a frictional contact-surface.

S represents an arm that is pivoted at its inner end to one side of the reel-frame. The outer end of the said arm is formed into or provided with an indicating-dial, T, which is provided with a series of numbers arranged progressively in a circle, and indicating yards and fractional portions thereof. From the dial T depends a plate, T', which is adapted to bear upon the outer side of the pinion R, so as to cover the latter.

U represents a large spur-wheel, which is journaled to the center of the dial, and on the arbor of the said spur-wheel is secured a hand or pointer, V, which is adapted to sweep around the dial as the wheel U is rotated.

W represents a frame which is pivoted to the same end of the reel-frame in which the roller is journaled. The said frame W comprises the pivoted arms W' and the bar W², connecting the said arms. In the outer ends of the arms W' are made open slots, in which are journaled the projecting spindles of the axle X of the hand-reel Y. The said hand-reel has its heads fitted loosely on the axle X, whereby the reel is free to rotate independently of the said axle, and the latter is provided with an arm, X', from the outer end of which extends a clamping-jaw, X². A spring-detent, Z, is attached to the hand-reel, and is adapted to engage the jaw X² when the latter is closed against one bar of the hand-reel.

From the foregoing description it will be readily understood that as the frame W is pivoted to the reel-frame it may be folded up against the latter, so as to cause the hand-reel to bear against the roller P.

The operation of our invention is as follows: The bolts of cloth are first wound upon the cloth-reels H by means of the crank I, which is adapted to be attached to either of the said reels, and the loose end of the cloth is compressed between one of the axles, K, by the spring-actuated teeth or tines of the adjacent axle, thus holding the ends of the bolts of cloth and preventing the cloth-reels from accidentally unreeling the cloth when the reel E is rotated. In order to measure off a portion of the contents of one of the reels H, the detent is disengaged from the notched disk of the reel E, and the latter is turned until the reel H, having the particular cloth desired, is at the bottom. The loose end of the cloth is then drawn over the roughened roller P and the frame W is turned up, and the end of the cloth is secured between the clamping-jaw $X^2$ and the hand-reel. It will be seen by reference to Fig. 2 of the drawings that the tines or teeth of the shaft over which the cloth from the reel H passes are arranged in such a position when the said reel is at the bottom of the reel E that the cloth may be freely reeled from the reel H containing it. The frame W is then turned down to the floor, and the hand-reel is rotated by means of a suitable crank-handle. As the cloth passes over the roughened roller P it causes the latter to rotate by frictional contact therewith, and the cloth is thus measured, and the hand or pointer which sweeps around the dial indicates the number of yards that have been unreeled from the reel H, as will be very readily understood.

Having thus described our invention, we claim—

1. The combination of the rotating reel E, the cloth-reels H, journaled therein, and the spring-actuated shafts K, journaled in the reel E and each having the detent tines or teeth L, adapted to bear upon the adjacent shaft K to clamp the free end of the bolt of cloth wound on the reels H, substantially as described.

2. The combination of the frame A, the reel E, journaled therein and having the cloth-reels H, the roller P, journaled in the frame A, the indicator geared to the said roller, and the frame W, hinged or pivoted to the frame A and provided with the hand-reel, the said frame W being adapted to fold up against the frame A, substantially as described.

3. The combination of the frame A, the reel E, journaled therein, the roller P, journaled in the frame A and having the pinion R, and the arm pivoted to the frame A and having the dial, and the wheel U, journaled to the said dial, adapted to mesh with the pinion R, and provided with the hand or pointer, for the purpose set forth, substantially as described.

4. The combination, with the frame A, the reel E, journaled therein and having the cloth-reels, of the frame W, pivoted to frame A, and the reel Y, journaled in frame W and having the pivoted clamping-jaw X, for the purpose set forth, substantially as described.

5. The combination of the frame A, the reel E, journaled therein and carrying the series of cloth-reels H, the friction-roller P, journaled in the frame A and having the pinion R, the arm S, pivoted to frame A and having the dial, the wheel U, to mesh with the pinion, journaled to arm S, and carrying the indicator to sweep over the dial, the frame W, pivoted to frame A and thereby adapted to fold onto the latter, and the reel Y, journaled in the frame W, substantially as described.

In testimony that we claim the foregoing as our own we have hereto affixed our signatures in presence of two witnesses.

CHARLES WESLEY CAMPBELL.
 JOHN J. HILL.
 WILLIAM E. DODD.

Witnesses:
 E. L. KIDD,
 GEO. S. STEVENS.